United States Patent [19]
Kiikka et al.

[11] 3,888,753
[45] June 10, 1975

[54] CORUSCATE ELECTRICAL DISCHARGE TREATMENT OF POLYMERIC FILM TO IMPROVE ADHERABILITY THEREOF TO GELATINOUS AND OTHER COATINGS

[75] Inventors: Lauri W. Kiikka, Victor; Ronald L. Hartman, Rochester, both of N.Y.

[73] Assignee: Eastman Kodak Company, Rochester, N.Y.

[22] Filed: Jan. 2, 1973

[21] Appl. No.: 320,050

Related U.S. Application Data

[63] Continuation-in-part of Ser. No. 171,656, Aug. 13, 1971, Pat. No. 3,755,683.

[52] U.S. Cl. ............... 204/168; 96/87 A; 204/165; 250/542; 250/544
[51] Int. Cl. .................. G03c 1/82; H01t 19/04
[58] Field of Search ...................... 204/168, 165; 150/531–542–547

[56] References Cited
UNITED STATES PATENTS

| | | | |
|---|---|---|---|
| 3,282,833 | 11/1966 | Pfeffer | 204/168 |
| 3,284,331 | 11/1966 | McBride et al. | 204/165 |
| 3,294,971 | 12/1966 | Von Der Heide | 250/531 X |
| 3,308,045 | 3/1967 | Sullivan | 250/531 X |
| 3,376,208 | 4/1968 | Wood | 250/531 X |
| 3,419,489 | 12/1968 | Delaney | 250/531 |
| 3,600,122 | 8/1971 | Coleman | 204/168 X |
| 3,668,097 | 6/1972 | Eisby | 204/168 |

FOREIGN PATENTS OR APPLICATIONS

| | | | |
|---|---|---|---|
| 925,354 | 5/1963 | United Kingdom | 250/531 |

*Primary Examiner*—F. C. Edmundson
*Attorney, Agent, or Firm*—E. W. Milan

[57] ABSTRACT

Hydrophilicity of a polymer film surface is increased by a process wherein a web of polymer is transported through an elongated coruscate electrical discharge field generated by a high voltage alternating current source on said surface of the web while the opposite surface of the web is transported in engagement with an electrically conducting surface, which may be a guide or a support means, such as a metal roll, causing a multiplicity of coruscate electrical discharges in the field to substantially continuously track on the said polymeric film surface of the web and to increase its hydrophilicity as it moves through and along the coruscate electrical discharge field. The coruscate discharge appears similar in appearance to the white-hot tip of an oxidizing flame. As a result of the coruscate electrical discharge treatment, excellent adhesion of gelatinous and other coatings to polymeric film surfaces both of treated, oriented and unoriented polymers in web form is achieved under both dry and wet film handling and processing conditions. Polymer film surface treated by the coruscate electrical discharge field has improved adhesive qualities for use in, among other things, heat-sealing operations in which a plastic film is heat-sealed to the treated surface, and in photographic coating operations in which a photographic silver halide emulsion layer, a nucleating layer, actinic radiation-sensitive layer, or the like, is coated onto the treated surface. The process is also useful for treating the polymer film surface of a polymer-coated or impregnated web, such as a polymercoated photographic support paper, to obtain the same type of improved adhesive qualities.

11 Claims, 2 Drawing Figures

CORUSCATE ELECTRICAL DISCHARGE TREATMENT OF POLYMERIC FILM TO IMPROVE ADHERABILITY THEREOF TO GELATINOUS AND OTHER COATINGS

This application is a continuation-in-part of Ser. No. 171,656, filed Aug. 13, 1971, now U.S. Pat. No. 3,755,683.

BACKGROUND OF THE INVENTION

1. Field of the Invention

This invention relates generally to the treatment of polymer film surfaces, and, in one aspect, to treating at least one surface of a polymeric film, which may be oriented or unoriented, but to which coatings are generally non-adherent, in an electrical discharge field to achieve improved adhesion of photographic emulsion coatings or other coatings which coatings must be adherent under both dry and wet film processing conditions. The polymers of which the surfaces are to be treated are generally linear polymers that are crystalline or partially crystalline, and oriented or non-oriented and which usually are hydrophobic and the surfaces of which need to have hydrophilicity increased in order to improve adherability to coatings or to other film surfaces. Generally, the coatings that are intended to be adhered to the electrical discharge treated polymer film surfaces are hydrophilic or highly polar, actinicallysensitive layers and, preferably, they are photographic gelatin silver halide emulsion layers.

2. Description of the Prior Art

The surface treatment of organic plastic materials to render their surfaces receptive to inks, adhesives, and other coating materials is described in U.S. Pat. No. 3,192,385. This surface treatment involves passing the plastic material between a pair of spaced electrodes, one of which is a grounded supply roller drum on which the film is supported, and supplying the ungrounded electrode with radio frequency voltage. Another method, disclosed in U.S. Pat. No. 3,376,208, involves forming an electrical discharge, which may be as high as 60,000 volts A.C. or 100,000 volts D.C., between two electrically conducting electrodes, both positioned on one side of the film, with the power electrode is series with a resistor to limit the discharge to a form of electrical discharge described as a "corona and spark discharge," while passing the film surface over a nonconductive support roller and through and along the discharge field. Also, U.S. Pat. No. 3,135,676 teaches a method of treating the surface of a synthetic organic plastic material to alter the properties thereof which comprises disposing a pair of spaced electrodes having opposite confronting discharge edges along and in close proximity to said surface and establishing an electrical discharge of between 1,000 and 10,000 volts between said edges, which discharge extends in a direction along and in close proximity to and substantially hugs the surface between the electrodes. The power electrode of the patent is coated with a dielectric material. No support is shown to be used for the film in the vicinity of the electrodes.

The above methods and other similar methods have come into widespread use for the treatment of oriented and unoriented polymeric films, particularly polyolefins, such as polyethylene, in order to increase their adherent qualities. Although such treatments have been found successful in promoting of adhesion of printing inks, adhesives, decals and various types of coating to the treated film surfaces, the treatments have not been found entirely satisfactory for treating surfaces of oriented crystalline or semi-crystalline polymers, particularly polymers used in film or polymer-coated paper form intended for use as a photographic film support for silver halide gelatin emulsions. By oriented film, we mean film that has been stretched in processes knows as drafting and tentering in order to give it improved tensile strength and crystallization. For photographic use such film is further heat-set, i.e. heat-treated, to give it dimensional stability. In the case of oriented polymeric polyester film such as oriented, heat-set, semi-crystalline poly(ethylene terephthalate), the surface thereof is more chemically inert after the film has been stretched to obtained the obtain biaxial orientation and has been heat set. The resulting higher degree of crystallization and the higher tensile strength of the film produces a polymeric film surface which is more or less hydrophobic and more difficult to coat with another organic plastic material in a heat sealing operation or with a photographic emulsion, or the like, to achieve satisfactory adhesion.

The emulsion coatings which generally are used in the photographic film manufacturing art and which can be utilized in practice of the present invention are of the hydrophilic type in which the binder is gelatin or a polymer (either organic or inorganic) containing polar groups. Emulsions used in photographic emulsion coatings of this type, especially silver halide emulsions, are well known and are described, for example, in *Product Licensing Index*, vol. 92, December 1971, publication 9232, pages 107–110, particularly in the paragraph entitled "I. Emulsion Types," which is incorporated herein by reference. Vehicles for such coatings are also well known and are described in the above publication in the paragraph entitled "VIII. Vehicles," also incorporated herein by reference. The emulsion coating can also contain other ingredients commonly used in photographic silver halide emulsion coatings, such as hardeners, chemical sensitizers, development modifiers, antifoggants, stabilizers, developing agents and the like as described in the above publication.

One method of treating oriented heat-set polymeric film so that coatings such as a photographic emulsion coating will adhere thereto under both dry and wet film processing conditions is in widespread use and involves initially coating the polymeric film base, before orienting it, with a polymer latex coating. The film is then oriented and heat-set. The film is then coated with a subcoating containing polymer, gelatin and solvents or surfactants, and, next, the photographic emulsion is coated on the subcoating. Although satisfactory, this method has the disadvantages of requiring the initial polymer latex coating to set and the additional subcoating operation. Also, it requires use of solvents or surfactants, which may later interfere with the adhesive bond between the emulsion layer and film support. Also such methods require expensive solvent recovery systems to avoid fire and solvent toxicity hazards. Another method of obtaining adherence is described in U.S. Pat. No. 3,072,483 and involves a flame treating method. However, flame treatment of oriented polymeric film to improve its adherability has not come into widespread use, possibly because suitable commercial equipment has not been generally available. In addition, flame treatment of film of the thickness of 1 to about 10 mils, as is used for support in the photographic arts, is difficult to control, yields non-uniform results, and the possibility of distorting the film with the flame still exists.

SUMMARY OF THE INVENTION

This invention includes within its scope an improved method for treating surfaces of both oriented and unoriented polymers, particularly surfaces of polymers in web form, such as film and paper or other substrate coated with polymer, so that excellent adhesion will result for heat treating operations on the treated surface of the polymeric web, such as heat-sealing. It also includes within its scope a method for treating polymeric film surfaces for coating operations on the surfaces, such as with photographic emulsion coatings to obtain excellent adhesion of the coatings under both dry and wet film processing conditions. This excellent adhesion is achieved by subjecting the polymer film surface which is to be coated to a coruscate electrical discharge in a coruscate electrical discharge field generated by a high voltage alternating current. The appearance of the coruscate discharge is similar to that of the white-hot tip of an oxidizing flame. The effect of the coruscate discharge is to increase the hydrophilicity of the polymer film surface.

The intended goals preferably are accomplished by transporting a continuous length of the polymeric film over a conducting surface, particularly a support roller, having an electrically conductive surface in substantial engagement with one surface of the film, and treating the opposite, non-supported surface surface of the film with coruscate electrical discharge within a coruscate electrical discharge field extending between two substantially parallel electrodes (one being a power electrode and the other a ground electrode) located on the same side of the film and spaced apart in the lengthwise direction of the web, and separated from the film surface by air gaps. The non-supported surface of the film passes through and along the coruscate electrical discharge field. A glittering discharge occurs between the two electrodes by virtue of the contact of the conductive surface of the conducting roller with the opposite, supported, side of the film and the resulting tracking of the electrical discharges on the surface of the film between the electrodes. The overall result is considerable improvement in hydrophilicity and of the adhesability properties of the polymer film surface.

Surprisingly, we have discovered that normally hydrophobic oriented polymeric film as well as unoriented polymeric film whether unsupported or supported, e.g. on a web substrate such as paper, having one surface in contact with a metal roller, and its opposite surface subjected to coruscate electrical discharge in a coruscate electrical discharge field, results in a treated film having increased hydrophilicity over its original degree of hydrophilicity. The treated film surface thereby becomes one to which a coating, such as a photographic emulsion, particularly a silver halide emulsion, strongly adheres under both dry and wet film processing conditions without the necessity of using first a polymer latex coating and/or a subcoat that contains adverse solvents or surfactants that later may interfere with the adhesive bond between the emulsion layer and the film support.

By a coruscate electrical discharge, we mean an electrical discharge that involves intermittent flashes or sparkles of high voltage electricity of between about 15,000 and about 50,000 volts or higher that appear to wiggle or travel from a power electrode to a ground electrode located near the same surface of a polymeric film along many random tracks or varied paths on the surface of the film and which are similar in color to the white-hot color of the tip of a hot oxidizing flame. The flashes of electricity appear to be accompanied by glittering along the periphery thereof.

The coruscate electrical discharge not only is considerably different in appearance from the aforementioned corona and spark electrical discharges, but results in differences in the physical effects produced on the surface of the film. The corona electrical discharge is substantially silent and appears usually as a colored circle around and close to a luminous body, such as a faint bluish glow adjacent to the surface of an electrical conductor at high voltage. A spark discharge normally involves a crackling, luminous disruptive electrical discharge of very short duration between two conductors. The coruscate electrical discharge may be likened to a continuous emission of flashes of electricity accompanied by a deafening roar. The flashes travle in an arcuate path from one electrode to the other (located on the same surface of the web to be treated) and form tracks upon the surface of the film without perforating the film.

Although there are definite visual and sound differences between a coruscate electrical discharge and a corona or spark discharge or a combination thereof, major differences between such electrical discharges are shown by the test results achieved in a number of tests for determining hydrophilicity and adhesive bonding carried out on test samples of non-coated and coated oriented polymeric film treated by coruscate electrical discharge as compared to test results achieved with similar test samples treated with corona or spark electrical discharges.

Tests used for this purpose are the following:

a. "Dichloromethane solvent treatment" of the treated surface at room temperature. The solvent brings out a haze in those areas of the film surface which have been electrically altered by the treatment. A positive test result is indicative of alteration of the surface from its original condition.

b. "Contact angle measurement" (referred to herein as the bubble method) of a drop of distilled water placed on a level surface of the treated polymer film surface. A low contact angle, e.g. under 45°, is indicative of fair to good hydrophilicity of the surface and a high contact angle of 75° to 90° is indicative of little or no hydrophilicity when the polymer is poly(ethylene terephthalate) oriented, heat-set, semi-crystalline.

c. The "cellophane tape test" for dry adhesion. In this test the emulsion coated layer is scored in a cross-hatch pattern and a piece of cellophane is pressed firmly over the cross-hatched area and stripped away quickly to indicate dry adherence or non-adherence of the layer to the film surface.

d. The "wet rub-off test" in which emulsion-coated film, after drying is passed through alkaline and acidic photographic film processing solutions, such as a developer and a hardening fix, and then is washed for one hour in water. The wet emulsion-coated film then is rubbed firmly between the thumb and finger to determine if it remains adherent or rubs away.

In the dichloromethane solvent treatment test, non-coated, oriented heat-set semi-crystalline poly(ethylene terephthalate) film which has been treated with a corona discharge or a spark electrical discharge does not give a positive test result. In addition, such non-coated treated film when wet by distilled water droplets in the contact angle measurement test has a high contact angle by the bubble method of around 36°, indicative of a fair degree of hydrophilicity. When such treated film was coated with a gelatinous silver halide emulsion, it was found to possess only some dry adherence to the film when tested by the cellophane tape, and only some wet adherence to the film when tested in the wet rub-off test. On the other hand, the surface of non-coated oriented polymeric film, particularly of oriented, heat-set, semi-crystalline poly(ethylene terephthalate), which was treated by the coruscate electrical discharge as described herein was found by the dichloromethane solvent treatment test to contain a plurality of visual randomly directed lines or tracks on the treated surface. The tracks covered a high percentage, but not one hundred percent of the surface, and did not appear to have any substantially adverse photographic effects on the photographic silver halide gelatin emulsion subsequently coated directly on the treated surface. The lines or tracks on the coruscate discharge treated surface of the non-coated film brought out by the dichloromethane formed a permanent haze which is believed to be indicative of alteration of the surface by way of chemical or physcial surface changes of poly(ethylene terephthalate). The non-coated, treated poly(ethylene terephthalate) film when wet by distilled water droplets was found to have a low contact angle of around 17° by the bubble method, indicative of a high degree of hydrophilicity. When the treated poly(ethylene terephthalate) film was coated with a gelatinous silver halide emulsion and subjected to the cellophane tape test and to firm multiple wet rub-off tests, the emulsion adhesion to the film was found to be excellent.

One object of the present invention is to provide an improved method for treating a polymeric film surface, for example, a surface of an unsupported film or of a supported film surface, such as that of a polymer coated on a web support, such as paper, in order to increase the hydrophilicity of the surface and thereby to increase the adherent properties and receptivity thereof.

Another object of the invention is to provide an improved method for treating such a polymeric film surface to increase its hydrophilicity, so that a photosensitive coating, such as a photographic silver halide emulsion layer, nucleating layer, actinic radiation-sensitive layer, or the like, may be coated onto or secured to the treated surface with excellent adherence both under dry and under wet handling and processing conditions without the addition to and the presence on the treated surface of a subcoat layer that contains adverse solvents or surfactants that may later interfere with the adhesive bond between the coating and the polymer surface.

Another object of the invention is to achieve excellent dry and wet adhesion of a coating of photographic emulsion layer, preferably a silver halide emulsion hydrophilic subbing layer, antihalation layer, anti-static coating and the like, in which gelatin or other hydrophilic colloid is present as a binder, to film surfaces or both oriented and unoriented polymers having low hydrophilicity by increasing the hydrophilicity of the surfaces without objectionably distorting the film or producing surface defects or causing problems during photographic processing.

Another object of the invention is to achieve excellent dry and wet adhesion of a coating of photographic emulsion or the like to film surfaces of both oriented and unoriented polymers having low hydrophilicity, by transporting a continuous web of such polymer with one surface of the polymer web in engagement with an electrically conductive surface of a conducting roller, and treating the opposite polymer film surface of the web to a coruscate electrical discharge within a coruscate electrical discharge field. The discharge is distinguished from corona discharge by being similar in appearance to the white-hot tip of an oxidizing flame travelling along and forming tracks in and on the polymer film surface, thereby increasing the hydrophilicity of the polymer film surface.

Another object of the invention is to use a coruscate electrical discharge to treat a polymer film surface of an oriented polymer having low or inadequate hydrophilicity to increase the hydrophilicity to a sufficient level such that excellent wet and dry adhesion of a photographic emulsion or other photosensitive coating to said surface can be achieved and the coating cannot be stripped from such surface of the film during production, processing and use of the treated polymer. Also, in the case of polymeric film, both surfaces of the film can be treated, preferably in sequence, to obtain the benefits and advantages of the invention on both surfaces of the film, if desired.

Another object of the invention is to improve the hydrophilicity of polymer film surface of a web of substantially molten crystalline or partially-crystalline linear polymer to achieve adhesion of photographic or other photosensitive coating to the cooled polymer film surface by transporting a web of polymer, for example, low density polyethylene, with one surface in contact with an electrically conductive surface, such as that of a metal casting roll, and treating the opposite surface with a coruscate electrical discharge. The treated web can then be deposited on a support, such as paper, with the treated surface uppermost to form a treated, polymer-coated laminate, or web, in a known way and thus obtain the benefits of the invention.

The invention and its objects and advantages will become more apparent from the detailed description of the preferred embodiments and the examples presented below.

BRIEF DESCRIPTION OF THE DRAWING

In the following detailed description of the preferred embodiment of the invention, reference is made to the accompanying drawing, in which.

DESCRIPTION OF THE PREFERRED EMBODIMENTS

In a preferred embodiment, the film treating apparatus of the invention generally comprises one or more electrically conducting rollers having electrically conducting surfaces for supporting the film, a corresponding pair of spaced apart power and ground electrodes spaced from the periphery of each such conducting roller, and a polymeric film transported by any suitable means between each such conducting roller and its corresponding pair of electrodes, said electrodes being positioned within a coruscate electrical discharge discharging distance from said film. When high voltage alternating current electricity is caused to flow from the power to the ground electrode along the surface of the film adjacent to the electrodes, the film surface is subjected to a coruscate electrical discharge field which we have described in considerable detail in the section of this specification entitled "Summary of the Invention." Although only one conducting roller and one pair of power and ground electrodes are shown for treating a film surface in FIG. 1, it is, of course, possible to have a plurality of such rollers and corresponding pairs of electrodes in sequence, each fired by the same or separate power supplies. When both surfaces are to be subjected to the coruscate electrical discharge treatment, the film can be threaded through a sequence of rollers to present the reverse side to a treating arrangement later in the sequence, as will be apparent to one skilled in the art.

Figure 1:
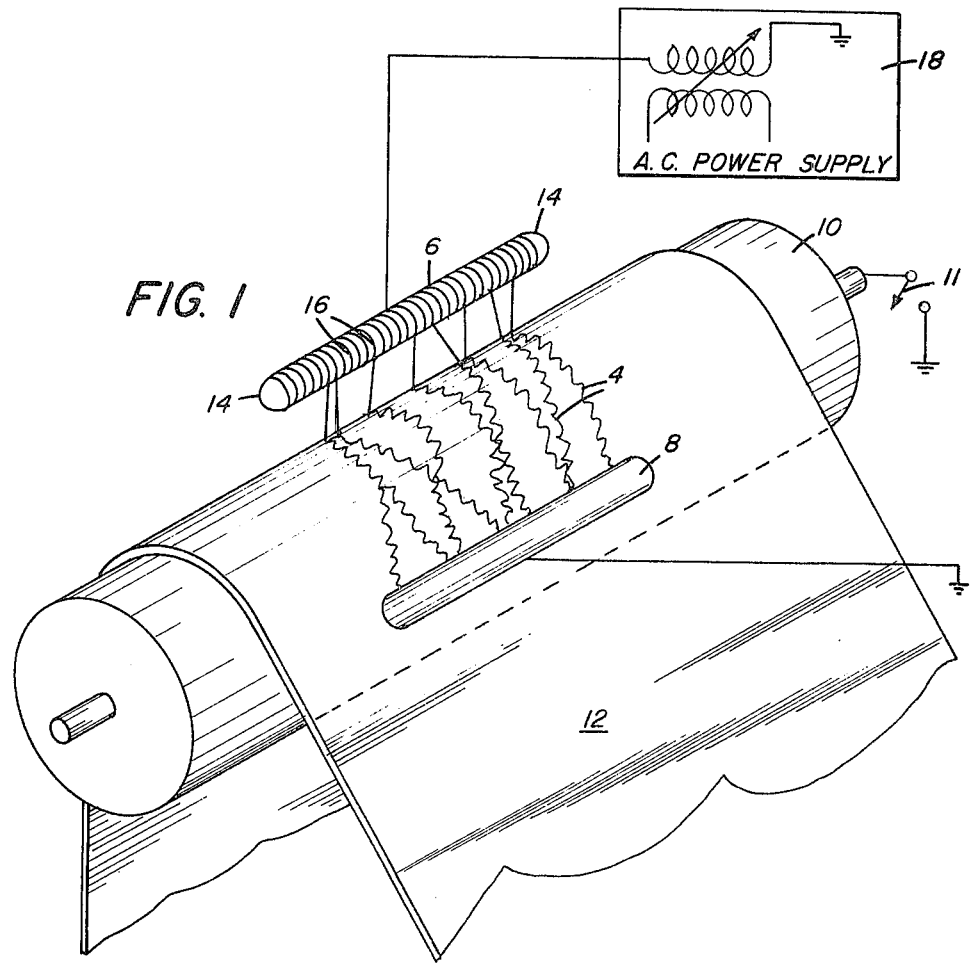
FIG. 1 is a perspective view of a preferred embodiment of an apparatus for carrying out the method of this invention.

In the preferred embodiment of the apparatus illustrated in FIG. 1 of the drawing, the coruscate electrical discharge field is illustratively shown as randomly directed zig-zag lines 4 achieved by a pair of spaced apart, parallel, elongated metal rod-like power and ground electrodes 6, 8 respectively. The electrodes are angularly spaced apart approximately 2.5 inches, preferentially 2 to 3 inches, along the periphery and parallel to the axis of a bare metal ground conducting conducting roller 10 of 3.75 inches diameter, which may or may not be grounded, but preferably is not grounded, through a switch 11. Each electrode 6, 8 is spaced a coruscate electrical discharge discharging distance of approximately an eighth of an inch above the non-supported surface of a polymeric film 12 transported at a speed between approximately 8 to 20 feet/minute, preferably of approximately 15 feet per minute. Electrode 8 is grounded and may be cylindrical or have any other suitable configuration fro receiving the discharge from electrode 6. Electrode 6 may be in the shape of a razor blade (which, however, creates individual coruscate electrical discharges almost entirely at the ends of the blade). Preferably the electrode is a threaded rod of the type generally disclosed in U.S. Pat. No. 3,294,971, but for this application the rod is preferably of 1/8 inch diameter, provided with rounded ends 14, and has threads 16 of approximately 32 per inch of length. For use in some applications, particularly in treating polyethylene-coated paper, where unusually high peaks of voltage may cause pinholes in the polymer, it is preferred to use a dielectric material, e.g. glass coating, to coat the power electrode knife-edges with an amount of dielectric material sufficient to prevent piercing of the polymer by the electrical flashes. Electrode 6 is connected to any suitable high voltage, alternating current power supply 18 generating a coruscate electrical discharge in a working output range of substantially between about 19 and 39 kilovolts, preferably between about 22 and 34 kilovolts and most preferably between about 30 and 34 kilovolts. The frequency of the current may be 60 Hertz or any other commercially available frequency, e.g. 50 Hertz. The current may vary between about 3 and 30 milliamps, preferably between about 3 and 10 milliamps and most preferably it may be 5 milliamps. A 100 kilovolt, 30 milliamp, 60 cycle A.C. Del Electronics-Corporation transformer having variable controls has been found especially advantageous for practice of the invention. The thickness of the polymeric films being treated may be in the range of about 1 to 10 mil, preferably between about 2.6 and 7 mil. The distance of the air gap, i.e. the coruscate electrical discharge distance, between each electrode and the surface of the transported film may vary between about 0.015 inches and 0.600 inches, but preferably the distance is about 0.125 inches. When the electrical power is connected to electrode 6, intermittent flashes 4 of coruscate electrical discharge occur from threads 16 of electrode 6 to the adjacent suface of film 12, and then travel in random fashion across and along the film surface to ground electrode 8 as partially depicted in FIG. 1. These flashes form random tracks in the treated film surface which cover a high percentage of the film surface and which become highly visible when the treated film is treated with printing ink, which adheres to the tracked surface but not to the non-tracked areas of the surface.

Figure 2:
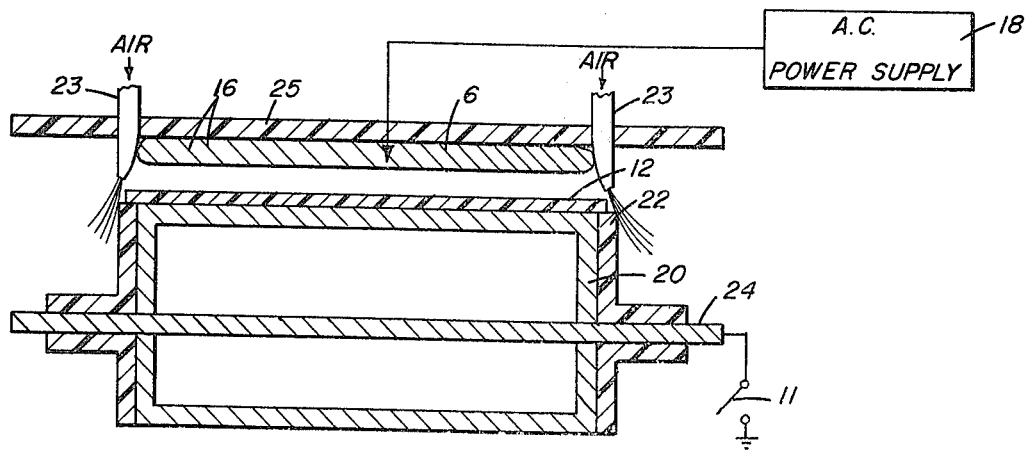
FIG. 2 is a front elevational view in section of a modification of the apparatus of FIG. 1.

It was found that the threaded rod form of power electrode 6 was less likely to produce burn holes through the film than power electrodes having acicular or needle-like projections, such as pins, combs or saw blades. Although a threaded rod electrode 6 was used, any equivalent power electrode may be used having an arcuate surface of substantially 90° and provided with approximately 32 or more axially spaced arcuate knife edges per inch of length. In the illustration of FIG. 1, the electrodes used were 5 inches long and produced a treated area of approximately 6 inches in width. If the threaded rod electrode 6 is substantially as wide as the film 12, the electrical power tends to arc over the edges of the film to the surface or ends of the metal conducting roller 10. Accordingly, in order to treat the film across its entire width, a modified apparatus is provided as shown in FIG. 2 having a metal conducting roller 20 mounted on a metal shaft 24 are provided with dielectric end caps 22 of any suitable electrical insulating material or the equivalent at each end. To further minimize the likelihood of arcing through the interface between the film and the outer periphery of end caps 22, dielectric arc knives or nozzles 23 are provided on an electrode support 25 at each end of the roller through which high pressure air is directed across the edges of film 12. The conducting roller and electrodes in each embodiment may be provided with a shroud, not shown, connected to any suitable vacuum source for exhausting any noxious fumes generated by the electrical discharge.

Surprisingly, the electrical discharge field 4 when applied to the non-supported surface of an oriented, heat-set semi-crystalline polymeric film 12 supported by metal conducting roller 10 alters the characteristics of the oriented semi-crystalline surface in several ways. First, a thin layer of the treated surface shows randomly directed tracks of the coruscate electrical discharge treatment when the treated surface is held at a low angle of illumination and visually examined. The tracks, which appear necessary to achieve excellent wet and dry emulsion adhesion, and yet do not appear to deleteriously affect the film for photographic purposes, need not cover one hundred percent of the surface to achieve excellent dry and wet adhesion of photographic emulsion coatings or the like to the treated surface. Second, if the linear polymer is, for instance, oriented, heat-set, semi-crystalline poly(ethylene terephthalate), the treated polymer surface gives the same positive test results when swabbed with dichloromethane at room temperature as does an untreated, unoriented, but amorphous poly(ethylene terephthalate) film surface. Such positive test result in the formation of a permanent haze believed to be indicative of surface changes and hydrophilicity of poly(ethylene terephthalate) and believed to be a necessary requirement for satisfactory adhesion, particularly for dry photographic emulsion adhesion. Third, the treated film surface of oriented, heat-set, semi-crystalline poly(ethylene terephthalate) was found to be readily wet by distilled water droplets for which an average contact angle of 17°, and less than about 20°, was recorded by the bubble method, thereby indicating a very high degree of hydrophilicity. Fourth, the dry adhesion of a photographic silver halide emulsion coating applied to the surface was excellent when determined by the cellophane tape test in which a strip of tape was pressed firmly to the dry emulsion surface and stripped off rapidly. Also, the wet adhesion of the emulsion coating was excellent when determined by a firm multiple wet rub-off test of the wet emulsion surface after passing the coated film through each alkaline and acidic processing solution of a photographic developing process. It was surprisingly found that the adherence of a photographic emulsion to, for instance, an oriented, heat-set, semi crystalline poly(ethylene terephthalate) film treated by the above-described coruscate electrical discharge treating method was excellent under both wet and dry conditions. It was further found in practicing the film treating method of this invention that if a dielectric material is added to the peripheral surface of metal roller 10 which is engageable by film 12 that the dry and wet emulsion adhesion to the above oriented film was unsatisfactory, thus confirming the need for the conducting surface opposite the non-treated surface during the treatment process.

The invention may be used to treat surfaces of a wide variety of hydrophobic polymers or polymers having inadequate hydrophilicity, including most, if not all, polymer film surfaces along which a high voltage coruscate electrical discharge can be made to track without piercing the surface or decomposing the polymer. Typical polymers whose surfaces can be treated to increase their adherability to photosensitive coating layers, such as photographic silver halide emulsion, and to other coatings and to promote heat sealability of the polymers to other polymeric surfaces include hydrophobic addition and condensation polymers which can be coruscate electrical discharge treated to effect adhesion of hydrophilic or highly polar photosensitive layers including a binder such as gelatin. These polymers include a polymer of at least one olefin, ester, organic carbonate, amide, vinyl or acrylic monomer or mixtures of the foregoing polymers. Such polymers include polyolefins such as polyethylenes, polypropylenes and ethylene-propylene copolymers; linear polyesters such as poly(ethylene terephthalate) and poly(ethylene terephthalates) modified with additional glycols and/or dicarboxylic acids, poly(1,4-dimethylenecyclohexylene terephthalates) modified with additional glycols and/or dicarboxylic acids, polyesters derived from dicarboxylic acid and diester and diacid halide derivatives of indan, for example, 1,1,3-trialkyl-5-carboxy-3-(carboxyphenyl) indan, and diols, particularly bisphenols, such as are described in U.S. patent application Ser. No. 813,705, polyesters derived from diol derivatives of indan, for example, 3,3,3',3'-tetramethyl-1,k'-spirobi(indan)-6,6'-polycarbonates, particularly polycarbonates of bisphenols and of substituted bisphenols; polyamides auch as 6,6-nylon; vinyl polymers such as poly(vinyl acetals), e.g. poly(vinyl butyral), polystyrene, polybutenes, and polypentenes, polyacrylonitrile, polyvinylidene chloride, and copolymers of styrene with acrylonitrile or other addition polymerizable monomers; addition polymers derived from acrylic acid and methacrylic acid and their esters, and acrylamides and methacrylamides such as copoly(ethyl acrylate-acrylic acid) and polyacrylamide; cellulose esters and modified cellulose esters containing sufficient added ethylene groups to provide a desired chain length such as cellulose diacetate, cellulose triacetate, cellulose propionate, cellulose butyrate, cellulose stearate and the like. Paper coated with any of the above polymers is especially useful when the polymeric film surface is treated with the coruscate electrical discharge to increase the hydrophilicity thereof.

The polymer to be treated preferably will be in web form. The term "web form" as used herein refers to any sheet form of the polymer. It is intended to include a substantially continuous sheet or roll of polymer which is self-supporting, such as an unsupported film of 1 to about 7 mils in thickness. It is also intended to include a substantially continuous sheet or roll of polymer which is integral with a support material, i.e. coated on or impregnated into a support, or substrate, such as a paper stock support. The polymer coating may be present on one or both surfaces of the support. In any case, a polymer film surface of the web which is to be made hydrophilic is always positioned facing the power and ground electrodes 6, 8 shown in the drawing, with the opposite surface in engagement with a conducting surface such as metal roll 10.

When the polymers to be treated are in unsupported film form, the polymers may be oriented or non-oriented and may be crystalline or partially-crystalline. When the polymers to be treated are to be coated on or impregnated into a support, e.g. paper, they may be crystalline, partially-crystalline or even, in some cases, amorphous but of low hydrophilicity. A crystalline or partially-crystalline form of polymer is preferably used.

The invention is especially advantageous when one of the above-described hydrophobic polymers is used to prepare a photographic element comprising a support of a polymer web having a surface altered to improve its adherability to a photosensitive coating. The support for such an element is prepared by a process wherein a polymeric film surface of the support is treated with coruscate electrical discharge to increase its hydrophilicity and thereby effect improved adhesion of differently sensitized photographic silver halide emulsion layers to the treated polymeric film surface, thereby obtaining greater uniformity of coating and stability of the emulsion layers. Suitable processes for coating photographic emulsion layers on supports are well known.

In practicing the process of the invention with a single pair of electrodes 6, 8, a web feed rate of 5 to 20 feet per minute has been found preferable for adhesion improvement treating surface of oriented, heat-set, semi-crystalline poly(ethylene terephthalate) in supported or unsupported film form of about 1 to 7 mils thickness. The poly(ethylene terephthalate) used preferably is polymer having an intrinsic viscosity in phenol:chlorobenzene in about 60:40 weight ratio of about 0.60 to 0.62 determined at about 25°C. in a solution containing about 0.25 gram of polymer per 100 milliliters of phenol:chlorobenzene. The treating is carried out by subjecting the polymer film surface to the coruscate discharge in a coruscate electrical discharge field of between about 19 and 39 kilovolts at 60 Hertz and between about 3 and 20 milliamps. The time of treatment is dependent on the web feed rate. Similar conditions can be used when paper or other support material impregnated or coated with such poly(ethylene terephthalate) is similarly treated for the same purpose. analogous When a film surface of a polymer having a lower melting point than that of the above described poly(ethylene terephthalate) is to be coruscate electrical discharge treated, the treating conditions may need to be adjusted in order to avoid perforating or distorting the film or polymer-coated paper. For example, for treating film of 1 to 7 mil thickness extruded from polyethylene having a melt index in the range from about 0.5 to 15g. per 10 mimutes with ASTM test method D1238E and a melting point of about 80°C to about 100°C., the feed rate preferably will be from 5 to 20 feet per minute, but the voltage will be closer to 19kV A.C. than to 39 kV A.C. depending on the thickness of the film and on the melting point of the polyethylene.

Also, for higher speed treatment of the polymer film surface whether supported or non-supported, it will be clear to one skilled in the electrical discharge treatments art that a multiplicity of pairs of electrodes with adequate power supplies can be used to coruscate discharge treat the polymer film surface at speeds up to about 1000 feet per minute while achieving the benefits and advantages of the invention by way of improved hydrophilicity and consequent adherability of the treated surface.

The process also can be carried out advantageously in the presence of other atmospheres than air to modify the wet and dry adhesion properties of the polymer film surface. Preferably, the other atmosphere will include nitrogen, carbon dioxide, or at least one rare gas selected from argon, helium, krypton, neon, radon or xenon. The other atmosphere may be used alone or in mixtures with air.

The following examples serve to further illustrate the working of the invention.

EXAMPLE 1

One surface of each of four 5 inch wide strips of 7 mil thick oriented heat-set semi-crystalline poly(ethylene terephthalate) (PET) unsupported film was treated respectively with one of the sources of electrical discharge shown in Table I and compared with a similar non-treated 5 inch wide strip in a series of tests as shown in Table I.

Samples of the treated polymer film strips were subsequently coated with a hardened gelatin emulsion layer having incorporated therein yellow dye forming coupler silver halide such as is used in color photographic film. Improvement in adhesion was tested by the methods described above: (a) hydrophilicity by change in contact angle of a drop of water, (b) extent of surface changes of polymer surface areas by the dichloromethane solvent treatment test, (c) dry adhesion by the cellophane tape test, and (d) wet adhesion by a multiple wet rub-off test. The results of these tests are summarized in Table I.

The first column of Table I specifies the sample number. The second column specifies the film material and its thickness, i.e. 7 mil, oriented, heat-set, semi-crystalline poly(ethylene terephthalate). The third column relates to the various types of electrical discharge treatments which were used. The fourth column specifies the output in voltage and amperage of electrical discharge by the various test apparatuses used. The fifth column specifies the grounding methods used. The remaining four columns relate to the tests to which the treated poly(ethylene terephthalate) strips were subjected. Sample 1 represents an untreated film strip of the same poly(ethylene terephthalate). Samples 2–5 represent treated film strips. The poly(ethylene terephthalate) film was derived by extrusion of polymer having an intrinisic viscosity of about 0.62, determined as described above.

The test data of Table I demonstrate the surprising, superior effect of coruscate electrical discharge treatment upon the properties of film surface of oriented, heat-set, semi-crystalline poly(ethylene terephthalate) for the purpose of making the surface more hydrophilic and thereby providing good adhesion of a photographic gelatin silver halide emulsion layer to the polymer film surface.

Table I shows that with no electrical discharge treatment, or with vacuum glow discharge treatment, or with parallel plate ocrona discharge treatment, the non-coated treated poly(ethylene terephthalate) film reacted negatively to the dichloromethane test. Also, the coated treated film had "none" or only "some" dry adhesion by the cellophane tape test, and in the wet rub-off test for wet adhesion had a rating of none, 10, 4 and 10 respectively. The hydrophilicity test of the non-coated film, as represented by the contact angle (measured on a drop of water on the film surface), gave ratings of 62, 55, 36 and 19, for samples number 1–4 respectively. In contrast to samples number 1–4, the non-coated poly(ethylene terephthalate) of sample 5 which was treated according to the coruscate electrical discharge treatment of the invention, had a contact angle of 17°, a positive test with dichloromethane, and, most importantly, when coated with the photographic gelatin silver halide emulsion layer had excellent dry adhesion and a high wet adhesion rating of 1.

The combination of the low contact angle (17°) and the excellent dry and wet adhesions of the photographic gelatin silver halide emulsion layer to the coruscate electrical discharge treated surface of the poly(ethylene terephthalate) film strip obtained with sample number 5 clearly is not achieved by the vacuum glow or corona discharge treatment methods used to prepare tested samples 2 to 4. The benefits and advantages of the invention are thus clearly shown by the sample number 5 test results in comparison to those of samples number 1–4.

EXAMPLE 2

A roll of photographic paper stock is provided sized with gelatin and aluminum stearate and extrusion coated on each side with about 8 lbs. of polyethylene/1000 sq. ft. One polyethylene surface is treated at 20 f.p.m. in a coruscate electrical discharge field treating section of an apparatus such as that described herein and shown in the drawing. The field is generated by a voltage of about 34 kV A.C. at 60 Hertz and 7 milliamps. The treated surface is coated with coupler-containing gelatinsilver halide emulsion layers of the type described in Example 2 of Van Campen in U.S. Pat. No. 2,956,879. Such layers are adapted to development direclty to negative dye images (positive images with respect to a color negative used for exposing the layers). The resulting multi-layered photographic element is exposed to a color negative and color developed directly to produce positive substractive colored dye images in the layers. The adhesion of the layers to the treated polyethylene surface is found to be good to excellent by the cellophane tape test and the wet rub-off test after processing.

EXAMPLE 3

In this example, there is employed a roll of photographic paper stock sized with gelatin and aluminum stearate and extrusion coated on each side with about 8 lbs. of poly(ethylene terephthalate)/1000 sq. ft. One poly(ethylene terephthalate) surface is treated at 15 f.p.m. in a coruscate electrical discharge field treating section of an apparatus such as that described herein and shown in the drawing. The field is generated by a voltage of 34 kV A.C. at 60 Hertz and 5 milliamps. The treated surface is coated, exposed and developed as described in Example 2. The adhesion of the layers to the poly(ethylene terephthalate) surface is found to be good to excellent by the cellophane tape test and the wet rub-off test and after processing.

EXAMPLE 4

A 10 inches wide roll of 2.5 mil oriented, heat-set, semi-crystalline poly(ethylene terephthalate) unsupported film was positioned for treatment in a coruscate electrical discharge apparatus substantially as shown in the drawing and described herein. A coruscate electrical discharge field was generated between a 5 inch long eight thirty-seconds threaded brass rod power electrode and a 5 inch long eight thirty-seconds threaded brass rod ground electrode positioned parallel to the power electrode and spaced 2½ inches away from it. The film was supported on an ungrounded 3¾ inch bare metal ground roll with the power and ground electrodes separated from the film surface by a 0.125 inch air gap. Electrical power was supplied to the power electrode from a Del Electronics Corporation A.C. transformer having a rating of 100 kV A.C., at 30 ma (milliamps) 60 Hertz, at an output of 25 kV A.C. at 4 ma., 60 Hertz. The film feed speed was maintained at 15 feet per minute (f.p.m.) during the treatment of the film with the coruscate electrical discharge field. The treated film was found by the water contact angle measurement test to form a contact angle of 17°. It was also found to give a positive test result, i.e. formed a haze, when swabbed with dichloromethane in the dichloromethane solvent treatment test.

The treated film surface was tested for its heat sealing or bonding capability with a variety of polymeric surfaces. The heat sealing test was carried out by positioning two overlapping pieces of film material in a heated Elmes Press and applying 600 psi pressure at 315°F. for 3 seconds. The treated surface of the poly(ethylene terephthalate) was placed to interface in the press with the overlapping film to which sealing was to be carried out. In a preliminary test, it was determined that two pieces of untreated poly(ethylene terephthalate) of the type treated did not bond together when subjected to the sealing press conditions. The results with other test films are shown in Table II. The test results show that the treated poly(ethylene terephthalate) is heat sealable to the untreated sample of polyethylene, and to poly(ethylene terephthalate) which has been subjected to other types of surface treatments, and to treated poly(ethylene terephthalate) itself. Also, as may be seen by comparison of Samples No. 6 and 7, coruscate discharge treated poly(ethylene terephthalate) is heat-sealable to processed silver halide emulsion coating and forms an excellent bond therewith, whereas corona discharge treated poly(ethylene terephthalate) is not heat-sealable to such coating. This result is particularly beneficial and advantageous for splicing of heat-sealing of processed movie film haivng a coruscate treated poly(ethylene terephthalate) support.

The invention has been described in detail with particular reference to preferred embodiments thereof, but it will be understood that variations and modifications can be effected within the spirit and scope of the invention as described hereinabove.

TABLE I

| Sample No. | Film Material 7 Mil | Electrical Discharge Treatment | Electrical Discharge Output | | Ground | Non-Coated Film | | Coated Film[5] | |
|---|---|---|---|---|---|---|---|---|---|
| | | | V. | Amp. | | Hydrophilicity by Contact Angle Measurement | Surface Changes by Dichloromethane Test | Dry Adhesion by Tape Test | Wet Adhesion by Rub-off Test* |
| 1 | PET(a) | No discharge treatment | — | — | — | 62° | Negative | None | — |
| 2 | PET | Vacuum glow-discharge (1 min.) | 3000 | ½ | Grounded electrode | 55° | Negative | Some | 10 |
| 3 | PET | Conventional Corona Discharge[1] | 11kV | 1.3RF amp[2] | Grounded Roller | 36° | Negative | Some | 4 |
| 4 | PET | 4×11 parallel plate corona discharge[3] | 19kV | 25 ma | Grounded Plate | 19° | Negative | Some | 10 |
| 5 | PET | Coruscate Discharge[4] | 34kV | 7 ma | Grounded Electrode Conducting Roller | 17° | Positive | Excellent | 1 |

(a)PET = poly(ethylene terephthalate), oriented, heat-set, semi-crystalline.
*A scale of value from 1-10 was assigned to evaluate the degree of wet peel-adhesion; a value of 1 represents excellent and a value of 10 poor adhesion.
[1]Kritchener-Traver rotary spark gap unit used.
[2]1.3 RF amp measured by special heat sensing device.
[3]Two 4×11 aluminum parallel plates with an ⅛ inch air gap, discharge provided by means of a 20 kilovolt, 30 milliamp, 60 Hertz AC Del Electronics-Corporation transformer.
[4]Electrical discharge provided by means of 100 kilovolts, 30 milliamp, 60 Hertz, AC Del Electronics-Corporation transformer to threaded power electrode.
[5]Coated with photographic gelatin silver halide emulsion layer on electrical discharge treated surface.

TABLE II

| Sample No. | Film Materials | | Seal Quality |
| --- | --- | --- | --- |
| | Film 1 | Film 2 | |
| 1 | PET* Coruscate Discharge Treated | PET Untreated, Amorphous | None |
| 2 | PET Coruscate Discharge Treated | Polyethylene, Untreated | Excellent, Film Tears Before Bond Breaks |
| 3 | PET Coruscate Discharge Treated | PET, Parallel Plate Corona Discharge Treated | Excellent, Film Tears before Bond Breaks |
| 4 | PET Coruscate Discharge Treated | PET, Flame Treated | Excellent, Film Tears before Bond Breaks |
| 5 | PET Coruscate Discharge Treated | PET, Coruscate Discharge Treated | Excellent, Film Tears before Bond Breaks |
| 6 | PET Coruscate Discharge Treated | PET, Coated with Photographic Silver Halide Emulsion and Processed | Excellent, Film Tears before Bond Breaks |
| 7 | PET Corona Discharge Treated, Parallel Plate | Cellulose Triacetate, Coated with Photographic Silver Halide Emulsion and Processed | None to Very Poor |

*PET = Poly(ethylene terephthalate), oriented, heat-set, semi-crystalline.

We claim:
1. A method for producing a coruscate electrical discharge which comprises:
   positioning a web of polymer between (1) a pair of spaced apart power and ground electrodes both located on the same side of said web and separated by air gaps from one surface of the web and (2) a conducting surface opposite the other surface of the web,
   supplying high voltage alternating current electricity from a power supply to the power electrode, said electrode having an arcuate surface of substantially 90° and being provided with a multiplicity of arcuate knife edges,
   discharging a multiplicity of intermittent flashes of high voltage electricity from said power electrode onto said one surface of the web,
   tracking the discharges on said surface to the ground electrode, and
   drawing off the electricity through the ground electrode,
   said web of polymer consisting essentially of a linear polymer which is crystalline or partially-crystalline and is oriented or non-oriented.

2. A process according to claim 1 wherein the polymer is a polymer of at least one olefin, ester, organic carbonate, amide, vinyl or acrylic monomer or a mixture of the foregoing.

3. A process according to claim 2 wherein the polymer is oriented, heat-set, semi-crystalline poly(ethylene terephthalate) film.

4. A process according to claim 2 wherein the polymer is semi-crystalline poly(ethylene terephthalate) integral with a support material. -(thiomorpholino- 5. A process according to claim 2 wherein the polymer is polyethylene integral with a support material.

6. A process according to claim 5 wherein said polymer is substantially molten.

7. The method according to claim 1 wherein the power supply supplies electricity sufficient to produce a coruscate electrical discharge in a working output range substantially between about 15 and 50 kilovolts of about 5 to 30 milliamps, at a commercially available frequency.

8. The method according to claim 7 wherein the power supply supplies electricity sufficient to produce a coruscate electrical discharge having a working output of substantially 34 kilovolts at 5 milliamps, 60 Hertz.

9. The method according to claim 1 wherein the power electrode is provided with approximately 32 or more axially spaced, arcuate knife edges per inch of length.

10. The method according to claim 1 wherein the power supply supplies electricity sufficient to produce a coruscate electrical discharge in a working output range substantially between about 22 and 34 kilovolts at about 5 to 10 milliamps at 60 Hertz.

11. The method according to claim 1 wherein the power electrode is covered with a dielectric material.

* * * * *

UNITED STATES PATENT OFFICE
CERTIFICATE OF CORRECTION

PATENT NO. : 3,888,753
DATED : June 10, 1975
INVENTOR(S) : Lauri W. Kiikka, Ronald L. Hartman It is certified that error appears in the above-identified patent and that said Letters Patent are hereby corrected as shown below:

Column 2, line 16, "obtain" should be --desired--.
Column 5, line 12, after "tape" should be --test--.

Column 7, line 44, change "fro" to --for--.
Column 8, line 42, change "are" to --and--.
Column 9, line 9, change "in" to --is--.
Column 10, line 7, after "6'" add --diol--.
Column 11, line 17, delete "analogous".
Column 13, line 9, change "direclty" to --directly--.
Column 14, line 40, change "haivng" to --having--.
Column 15, line 36, after "surface" add --located--.
Column 16, line 32, delete "-(thiomorpholino-".
Column 16, line 40, change "of" to --at--.

Signed and Sealed this second Day of December 1975

[SEAL]

Attest:

RUTH C. MASON
*Attesting Officer*

C. MARSHALL DANN
*Commissioner of Patents and Trademarks*